United States Patent
Ohshima et al.

(10) Patent No.: US 8,384,375 B2
(45) Date of Patent: Feb. 26, 2013

(54) NONCONTACT POSITION SENSOR

(75) Inventors: Mikihiro Ohshima, Fukui (JP); Motoki Ogata, Fukui (JP); Yoshinori Takashima, Fukui (JP)

(73) Assignee: Panasonic Corporation, Osaka (JP)

( * ) Notice: Subject to any disclaimer, the term of this patent is extended or adjusted under 35 U.S.C. 154(b) by 539 days.

(21) Appl. No.: 12/601,385

(22) PCT Filed: Jun. 13, 2008

(86) PCT No.: PCT/JP2008/001523
§ 371 (c)(1),
(2), (4) Date: Nov. 23, 2009

(87) PCT Pub. No.: WO2008/125818
PCT Pub. Date: Dec. 18, 2008

(65) Prior Publication Data
US 2010/0164485 A1 Jul. 1, 2010

(30) Foreign Application Priority Data
Jun. 14, 2007 (JP) .................................. 2007-157217

(51) Int. Cl.
*G01B 7/00* (2006.01)
*G01R 33/025* (2006.01)
(52) U.S. Cl. ............ 324/207.12; 324/207.2; 324/207.15; 324/207.24; 324/207.13; 324/207.11; 324/207.21
(58) Field of Classification Search ............... 324/207.2, 324/207.21, 207.24, 207.11–207.13, 207.15
See application file for complete search history.

(56) References Cited

U.S. PATENT DOCUMENTS

| | | | | |
|---|---|---|---|---|
| 2002/0089325 | A1* | 7/2002 | Schroeder | 324/207.12 |
| 2002/0145419 | A1* | 10/2002 | Luetzow et al. | 324/207.12 |
| 2004/0095130 | A1* | 5/2004 | Yokotani et al. | 324/207.21 |
| 2004/0160234 | A1* | 8/2004 | Denen et al. | 324/679 |

FOREIGN PATENT DOCUMENTS

| | | |
|---|---|---|
| EP | 1 482 762 | 12/2004 |
| JP | 59-133420 | 7/1984 |
| JP | 1-124509 | 8/1989 |
| JP | 05-264326 | 10/1993 |
| JP | 05264326 A * | 10/1993 |
| JP | 2005-051283 | 2/2005 |
| WO | 2007/032110 | 3/2007 |

OTHER PUBLICATIONS

International Search Report issued Jul. 8, 2008 in International (PCT) Application No. PCT/JP2008/001523.

\* cited by examiner

*Primary Examiner* — Jermele M Hollington
*Assistant Examiner* — Son Le
(74) *Attorney, Agent, or Firm* — Wenderoth, Lind & Ponack, L.L.P.

(57) ABSTRACT

A non-contact position sensor includes a magnet, magnetoresistive elements arranged on a line extending in a predetermined direction on a pole surface of the magnet with predetermined intervals, and an object made of magnetic material displaceable in the predetermined direction. The magnetoresistive elements are connected serially between a power supply and a ground. A first magnetoresistive element is connected to the second magnetoresistive element at a first node. A second magnetoresistive element is connected to a third magnetoresistive element at a second node. The object includes a projection and a shaft connected to the projection. The projection can face the first to third magnetoresistive elements. The shaft is located away from the pole surface by a distance longer than a distance between the projection and the pole surface of the magnet.

3 Claims, 6 Drawing Sheets

NONCONTACT POSITION SENSOR

BACKGROUND OF THE INVENTION

1. Technical Field

The present invention relates to a non-contact position sensor that detects a position of an object with magnetic field.

2. Background Art

FIG. 7 is a perspective view of conventional non-contact position sensor 501 described in Patent Document 1. Magnet 1 is magnetized in its thickness direction. Magnetic body 2 is made of permalloy and has an isosceles triangle shape having different widths at positions along a longitudinal direction. Magnetic body 2 is provided on an upper surface of magnet 1. Magnet 1 is provided on an upper surface of shaft 3. Shaft 3 has a side surface having groove 4 provided therein. Projection 6 is provided on an inner side surface of slider 5. While projection 6 is engaged with groove 4 of shaft 3, slider 5 slides in longitudinal direction 501A of shaft 3. Magnetoelectric converter 7 is provided on an upper surface of slider 5 and detects a magnetic field changing depending on the width of magnetic body 2. Magnetoelectric converter 7 is connected to lead wire 8. Lead wire 8 is connected to an external device, such as a computer.

An operation of conventional non-contact position sensor 501 will be described below.

Upon shaft 3 being displaced in longitudinal direction 501A with respect to magnetoelectric converter 7, magnetic body 2 having the isosceles triangle shape is displaced and the width of magnetic body 2 facing magnetoelectric converter 7 changes, accordingly changing a magnetic field crossing magnetoelectric converter 7. The change of the magnetic field is converted by magnetoelectric converter 7 to a change of a voltage. This change of the voltage is output via lead wire 8 to the external device, thus allowing the external device to detect the displacement of shaft 3.

Conventional position sensor 501 includes magnetic body 2 having an intricate shape, such as the isosceles triangle shape, and made of permalloy, thus being prevented from being manufactured easily.

Patent Document 1: JP5-264326A

SUMMARY OF THE INVENTION

A non-contact position sensor includes a magnet, first to third magnetoresistive elements arranged on a line extending in a predetermined direction on a pole surface of the magnet with predetermined intervals, and an object made of magnetic material displaceable in the predetermined direction. The first to third magnetoresistive elements are connected serially between a power supply and a ground. The first magnetoresistive element is connected to the second magnetoresistive element at a first node. The second magnetoresistive element is connected to the third magnetoresistive element at a second node. The object includes a projection and a shaft connected to the projection. The projection can face the first to third magnetoresistive elements. The shaft is located away from the pole surface by a distance longer than a distance between the projection and the pole surface of the magnet.

This non-contact position sensor does not include a component having a complicated shape and can be manufactured easily.

REFERENCE NUMERALS

21 Magnet
21A Pole Surface
22 Magnetoresistive Element (First Magnetoresistive Element)
23 Magnetoresistive Element (Third Magnetoresistive Element)
24 Magnetoresistive Element (Second Magnetoresistive Element)
25A Node (First Node)
25B Node (Second Node)
26 Power supply
27 Ground
28 Voltage Divider Circuit (First Voltage Divider Circuit)
28A Node (Third Node)
29A Fixed Resistor (First Fixed Resistor)
29B Fixed Resistor (First Fixed Resistor)
30 Voltage Divider Circuit (Second Voltage Divider Circuit)
30A Node (Fourth Node)
31a Fixed Resistor (Second Fixed Resistor)
31B Fixed Resistor (Second Fixed Resistor)
34 Comparator (First Comparator)
37 Comparator (Second Comparator)
41 Digital/Analog Converter
47 Object
48 Shaft
49 Projection

DETAILED DESCRIPTION OF THE INVENTION

Figure 1:
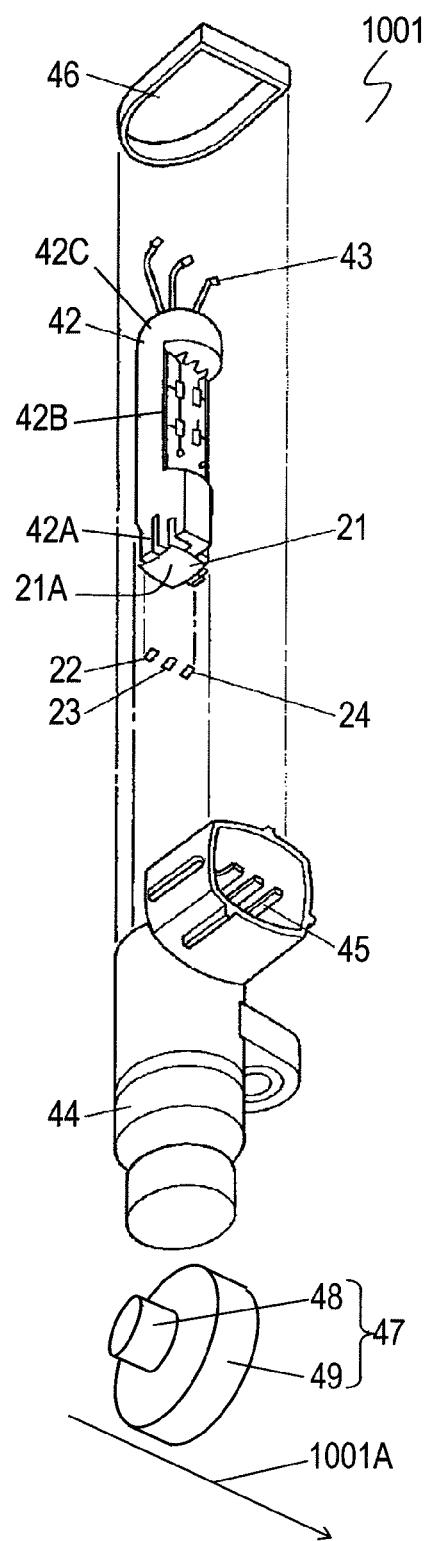
FIG. 1 is an exploded perspective view of a non-contact position sensor according to an exemplary embodiment of the present invention.
Figure 2:
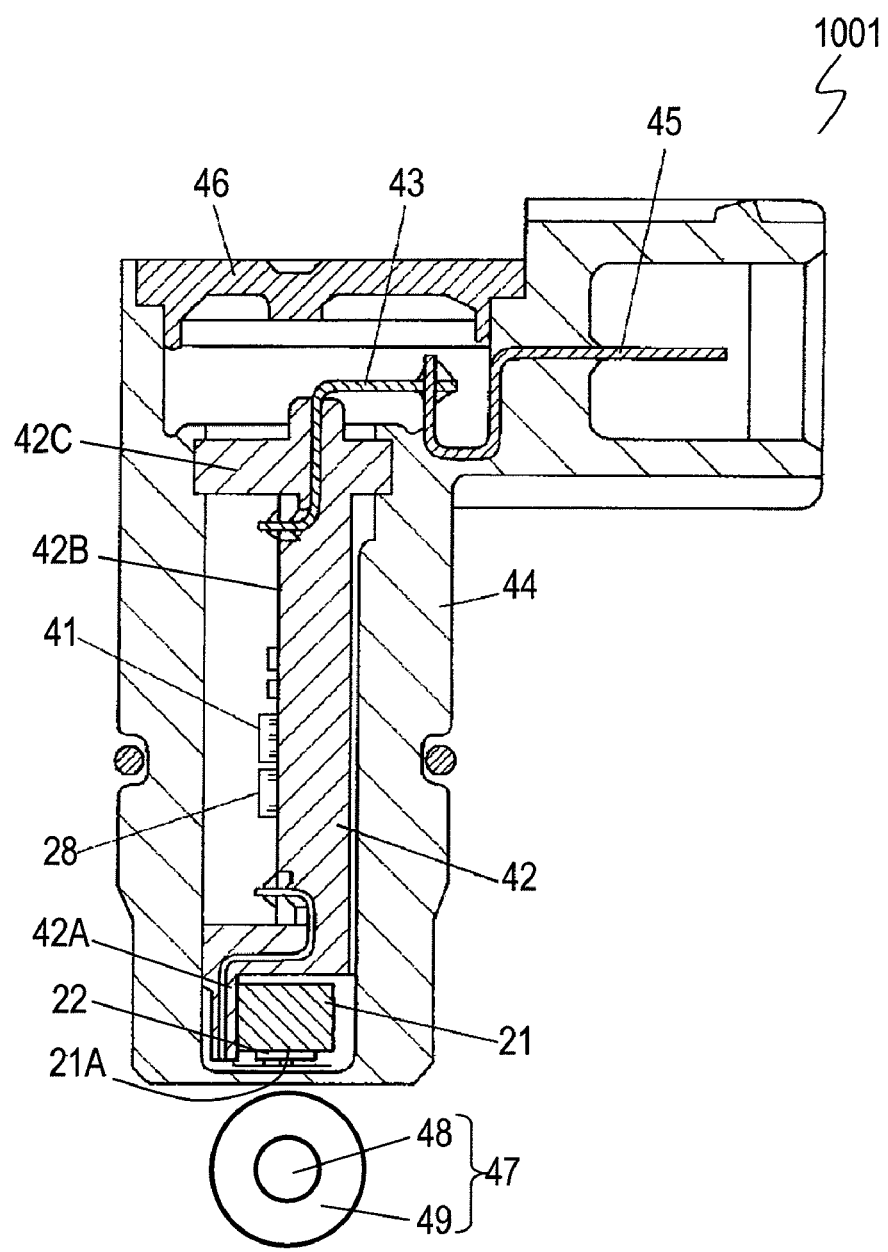
FIG. 2 is a cross-sectional view of the non-contact position sensor according to the embodiment.
Figure 3:
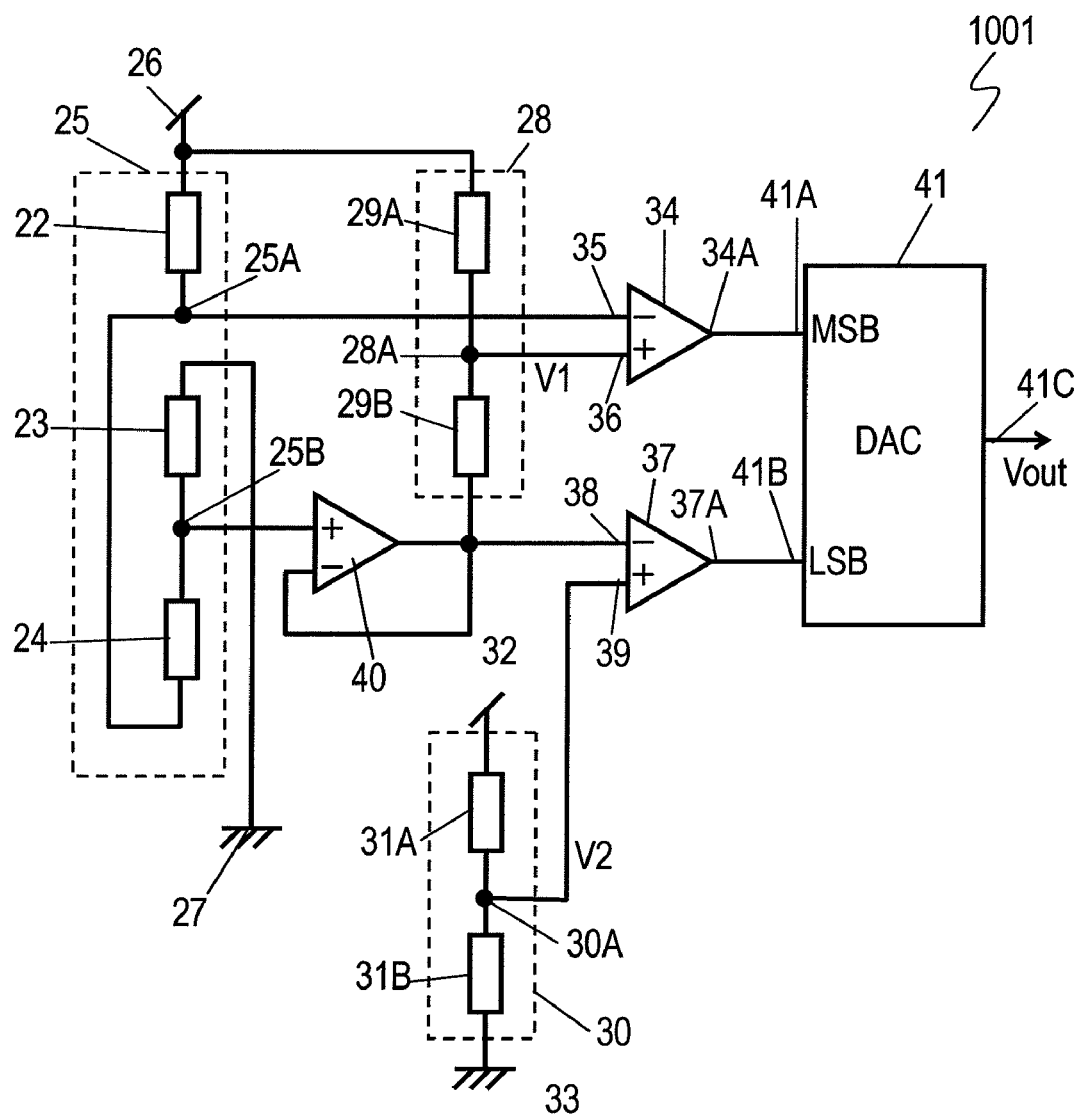
FIG. 3 is a circuit diagram of the non-contact position sensor according to the embodiment.

FIG. 1 is an exploded perspective view of non-contact position sensor 1001 according to an exemplary embodiment of the present invention. FIG. 2 is a cross-sectional view of non-contact position sensor 1001. FIG. 3 is a circuit diagram of non-contact position sensor 1001.

Magnet 21 has pole surface 21A generating a magnetic field. Magnetoresistive elements 22, 23, and 24 are provided on pole surface 21A and are arranged in this order on a line extending in predetermined direction 1001A with predetermined intervals P1. Magnetoresistive elements 22 to 24 are connected serially between power supply 26 and ground 27 to constitute magnetoresistive series assembly 25. Power supply 26 is connected to magnetoresistive element 22. Magnetoresistive elements 22 and 24 are connected at node 25A. Magnetoresistive element 23 and 24 are connected at node 25B. Ground 27 is connected to magnetoresistive element 23. Voltage divider circuit 28 includes fixed resistors 29A and 29B serially connected to each other at node 28A. Voltage divider circuit 30 includes fixed resistors 31A and 31B serially connected to each other at node 30A. Fixed resistors 31A and 31B are connected to power supply 32 and ground 33, respectively. The ratio of the resistance of fixed resistor 31A to the resistance of fixed resistor 31B is determined to be 2 to 1 so as to the potential at node 30A is set to ⅓ of the voltage of power supply 32.

Comparator 34 outputs a high level signal (high potential) from output port 34A when the potential of inverting input port 35 is lower than that of non-inverting input port 36, and outputs a low level signal (low potential) from output port 34A when the potential of inverting input port 35 is higher than that of non-inverting input port 36. Inverting input port 35 is connected to node 25A of magnetoresistive series assembly 25. Non-inverting input port 36 is connected to node 28A of voltage divider circuit 28. Comparator 37 outputs a high level signal (high potential) from output port 37A when the potential of inverting input port 38 is lower than that of non-inverting input port 39, and outputs a low level signal (low potential) from output port 34A when the potential of inverting input port 38 is higher than that of non-inverting input port 39. Inverting input port 38 is connected to node 25B of magnetoresistive series assembly 25 via amplifier 40. Non-inverting input port 39 is connected to node 30A of voltage divider circuit 30. According to the embodiment, amplifier 40 functions as a voltage follower. Inverting input port 38 of comparator 37 receives a potential at node 25B of magnetoresistive series assembly 25. Fixed resistor 29A of voltage divider circuit 28 is connected to power supply 26. Fixed resistor 29B is connected to inverting input port 38 of comparator 37. Digital/analog (D/A) converter 41 has most significant bit (MSB) input port 41A connected to output port 34A of first comparator 34, least significant bit (LSB) input port 41B connected to output port 37A of comparator 37, and output port 41C for outputting an analog signal (potential) depending on the level of a signal (potential) input to input ports 41A and 41B. Magnet 21 and magnetoresistive elements 22, 23, and 24 are fixed to end 42A of base 42 made of resin. Voltage divider circuits 28 and 30, comparators 34 and 37, amplifier 40, and D/A converter 41 are mounted onto side surface 42B of base 42, Connector terminal 43 is provided at end 42C opposite to end 42A across side surface 42B of base 42. Case 44 made of resin accommodates base 42 therein, and has connector terminal 45 projecting from case 44 to an outside of the case. Connector terminal 45 is connected to connector terminal 43 of base 42. Cover 46 seals an opening of case 44. Object 47 made of magnetic material includes shaft 48, and projection 49 which is connected to shaft 48 and has a columnar shape.

Figure 4:
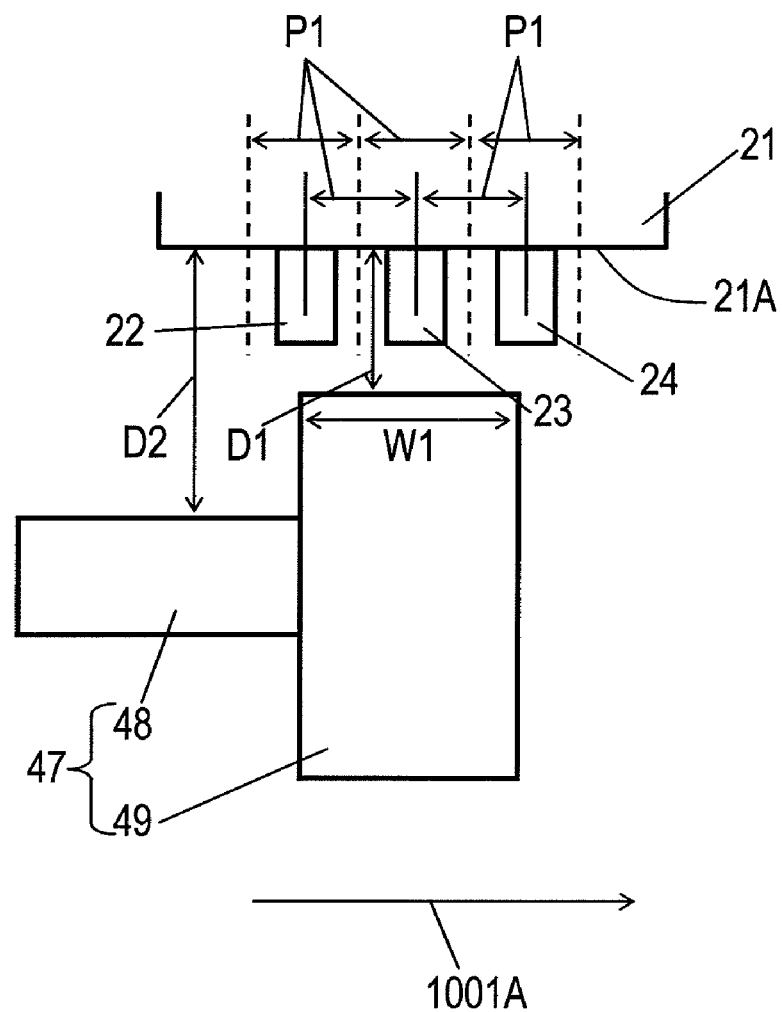
FIG. 4 is a schematic view of the non-contact position sensor according to the embodiment.

FIG. 4 is a schematic view of non-contact position sensor 1001. Magnetoresistive elements 22, 23, and 24 are arranged in direction 1001A with predetermined intervals P1 between them. Object 47 is displaceable in direction 1001A. Projection 49 has width W1 in direction 1001A that is equal to or smaller than the twice of interval P1. Shaft 48 and projection 49 are arranged in direction 1001A. Distance D1 between pole surface 21A and projection 49 is shorter than distance D2 between pole surface 21A and shaft 48. As described above, a surface of object 47 facing pole surface 21A, i.e., magnetoresistive elements 22, 23, and 24, and has a irregular shape. Thus, non-contact position sensor 1001 does not necessarily include a magnetic body having an intricate shape, hence being manufactured easily and efficiently.

Next, a method of manufacturing non-contact position sensor 1001 will be described. First, magnetoresistive elements 22, 23, and 24 are formed by vapor deposition on pole surface 21A of magnet 21 via a silicon substrate. Next, connector terminal 43 is placed in a die to form base 42 having end 42C into which connector terminal 43 is embedded. Next, magnet 21 is fixed to end 42A opposite to end 42C of base 42. Next, voltage divider circuits 28 and 30, comparators 34 and 37, amplifier 40, and D/A converter 41 are mounted onto side surface 42B of base 42. Case 44 having connector terminal 45 integrated therewith is prepared. Base 44 is accommodated in case 44. Then, connector terminal 43 of base 42 is soldered to connector terminal 45 of case 44. The opening of case 44 is sealed with cover 46. Then, object 47 is attached to a position facing a lower surface of case 44 so that projection 49 faces magnetoresistive elements 22, 23, and 24.

Figure 5A:
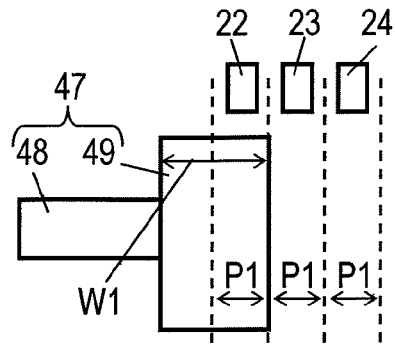
FIG. 5A is a schematic view of the non-contact position sensor according to the embodiment for illustrating an operation.

An operation of non-contact position sensor 1001 will be described below. FIG. 5A to FIG. 5D are schematic views of non-contact position sensor 1001 for illustrating the operation. In FIG. 5A to FIG. 5D, intervals P1 between magnetoresistive elements 22, 23, and 24 arranged in direction 1001A are 1.75 mm. Projection 49 of object 47 facing magnetoresistive elements 22, 23, and 24 has width W1 in direction 1001A that is twice longer than interval P1. FIG. 5A illustrates an initial position corresponding to a moving stroke of zero of object 47. An entire moving stroke of object 47 in direction 1001A is 7 mm. FIG. 6 illustrates voltage Vout output from output port 41C of D/A converter 41. In FIG. 6, the horizontal axis represents moving stroke L1 of object 47 in direction 1001A and the vertical axis represents voltage Vout. Magnetoresistive elements 22, 23, and 24 have characteristics identical to each other. Magnetoresistive elements 22, 23, and 24 have resistances changing according to the strength of a magnetic field crossing the elements. According to the embodiment, the larger the strength of magnetic field is, the higher the resistances are.

As shown in FIG. 5A, when moving stroke L1 ranges from 0 mm to 1.75 mm, projection 49 faces magnetoresistive element 22 and does not face magnetoresistive element 23 or 24. The magnetic field generated from pole surface 21A of magnet 21 concentrates locally to projection 49 of object 47 made of magnetic material. Magnetoresistive element 22 through which the concentrating magnetic field crosses has a resistance increase, and magnetoresistive elements 23 and 24 have resistances decrease. The potential at node 25A of magnetoresistive series assembly 25 is accordingly reduced. The ratio of a voltage between both ends of fixed resistor 29A of voltage divider circuit 28 to a voltage between ends of fixed resistor 29B is fixed. Thus, the ratio of the voltage between power supply 26 and node 28A to the voltage between power supply 26 and node 25B is fixed. Thus, the potential of node 25A becomes lower than potential V1 of node 28A, hence allowing comparator 34 to output the high level signal. The potential of node 25B of magnetoresistive series assembly 25 is reduced. Since potential V2 of node 30A of voltage divider circuit 30 is fixed, comparator 37 outputs the high level signal. Thus, the high level signals are input to input ports 41A and 41B, hence allowing D/A converter 41 to output voltage Vout of about 4.7V.

Figure 5B:
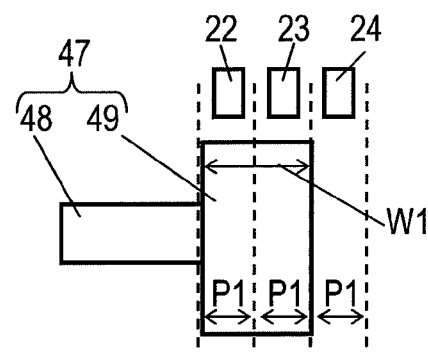
FIG. 5B is a schematic view of the non-contact position sensor according to the embodiment for illustrating the operation.
Figure 6:
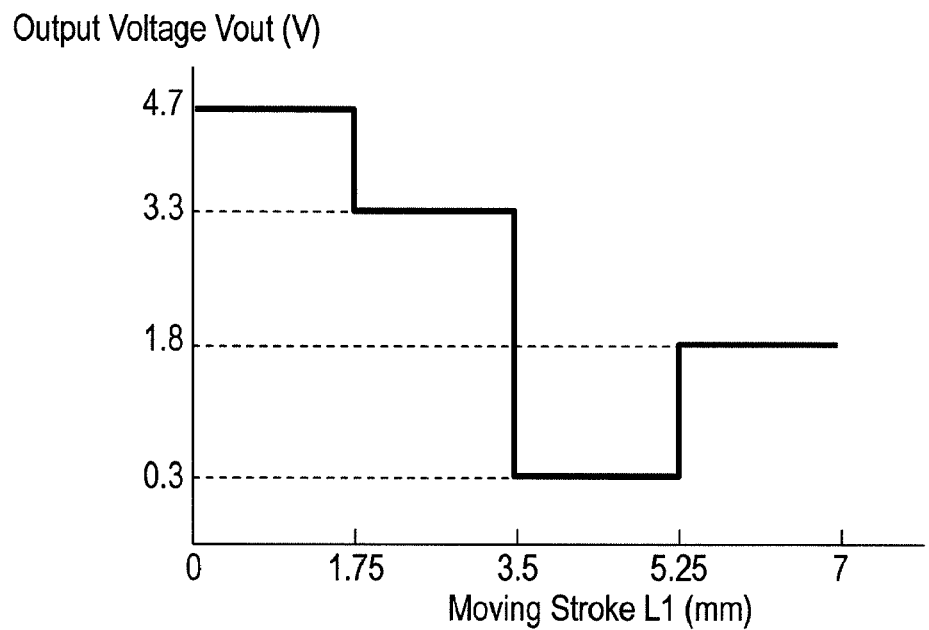
FIG. 6 illustrates the operation of the non-contact position sensor according to the embodiment.
Figure 7:
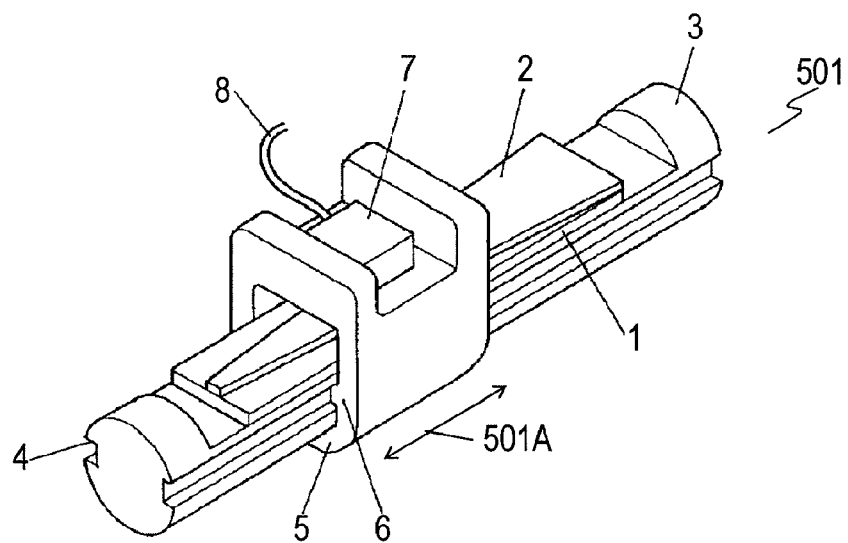
FIG. 7 is a schematic view of a conventional non-contact position sensor.

As shown in FIG. 5B, when moving stroke L1 of object 47 ranges from 1.75 mm to 3.5 mm, projection 49 faces both of magnetoresistive elements 22 and 23, and does not face magnetoresistive element 24. As a result, magnetoresistive elements 22 and 23 have resistances increase, and magnetoresistive element 24 has a resistance decrease. This raises the potential of node 25A of magnetoresistive series assembly 25. The ratio of a voltage between power supply 26 and node 28A to the sum of voltages between respective both ends of magnetoresistive elements 22 and 24, i.e., a voltage between power supply 26 and node 25B, is fixed. Thus, the potential of node 25A becomes lower than potential V1 of node 28A, hence allowing comparator 34 to output the high level signal. At this moment, while the potential of node 25B of magnetoresistive series assembly 25 rises, potential V2 of node 30A of voltage divider circuit 30 is fixed, hence allowing comparator 37 to output a low level signal. Thus, the high level signal is input to input port 41A of most significant bit, and the low level signal is input to input port 41B of least significant bit, hence allowing D/A converter 41 to output voltage Vout of about 3.3V.

Figure 5C:
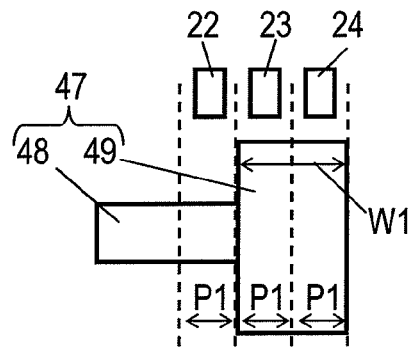
FIG. 5C is a schematic view of the non-contact position sensor according to the embodiment for illustrating the operation.

As shown in FIG. 5C, when moving stroke L1 of object 47 ranges from 3.5 mm to 5.25 mm, projection 49 faces both of magnetoresistive elements 23 and 24, and does not face magnetoresistive element 22. Thus, magnetoresistive elements 23 and 24 have the resistances increase, and magnetoresistive element 22 has the resistance decrease. As a result, the potential at node 25A of magnetoresistive series assembly 25 is educed. The ratio of the voltage between power supply 26 and node 28A to the sum of voltages between respective both ends of magnetoresistive elements 22 and 24, i.e., a voltage between power supply 26 and node 25B, is fixed. Thus, the potential of node 25A becomes higher than potential V1 of node 28A, hence allowing comparator 34 to output a low level signal. At this moment, while the potential of node 25B of magnetoresistive series assembly 25 rises, potential V2 at node 30A of voltage divider circuit 30 is fixed, hence allowing comparator 37 to output a low level signal. Thus, the low level signals are input to input ports 41A and 41B, D/A converter 41 outputs voltage Vout of about 0.3V.

Figure 5D:
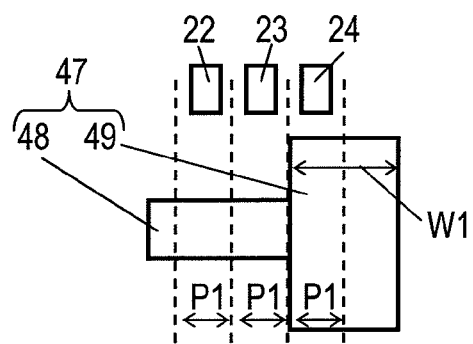
FIG. 5D is a schematic view of the non-contact position sensor according to the embodiment for illustrating the operation.

As shown in FIG. 5D, when moving stroke L1 of object 47 ranges from 5.25 mm to 7 mm, projection 49 faces magnetoresistive element 24 and does not face magnetoresistive element 22 or 23. Thus, magnetoresistive element 24 has a resistance increase, and magnetoresistive elements 22 and 23 have resistances decrease. As a result, the potential of node 25A of magnetoresistive series assembly 25 increases. The ratio of the voltage between power supply 26 and node 28A to the sum of voltages between respective both ends of magnetoresistive elements 22 and 24, i.e., the voltage between power supply 26 and node 25B is fixed. Thus, the potential of node 25A becomes higher than potential V1 of node 28A, hence allowing comparator 34 to output a low level signal. At this moment, the potential of node 25B of magnetoresistive series assembly 25 rises, and potential V2 of node 30A of voltage divider circuit 30 is fixed, hence allowing comparator 37 to output a high level signal. Therefore, a low level signal is input to input port 41A of most significant bit, and a high level signal s input to input port 41B of least significant bit, hence allowing D/A converter 41 outputs voltage Vout of about 1.8V.

Comparator 34 compares the potential of node 25A with fixed potential V1, and outputs a high level signal and a low level signal based on the result of comparison. Comparator 37 compares the potential of node 25B with fixed potential V2 and outputs a high level signal and a low level signal based on the result of comparison. D/A converter 41 converts a digital signal including the signals output from comparators 34 and comparator 37 into an analog signal (voltage Vout). Projection 49 of object 47 can face magnetoresistive elements 22, 23, and 24. Shaft 48 of object 47 that is displaceable in predetermined direction 1001A is located away from pole surface 21A by distance D2 longer than distance D1 between projection 49 and pole surface 21A of magnet 21.

The detailed shape of object 47, an order of the arrangement of magnetoresistive elements 22, 23, and 24, and the circuit are not limited to the above-described ones.

A non-contact position sensor according to the present invention does not include a component having an intricate shape and can be manufactured easily. The non-contact position sensor is useful for detecting a position of an object based on a change of magnetic field.

The invention claimed is:

1. A non-contact position sensor, comprising:
a magnet having a pole surface;
magnetoresistive elements arranged on a line extending in a predetermined direction on the pole surface of the magnet with predetermined intervals between the magnetoresistive elements, the magnetoresistive element being connected serially between a power supply and a ground, a first magnetoresistive element being connected to a second magnetoresistive element at a first node and the second magnetoresistive element being connected to a third magnetoresistive element at a second node;
a first voltage divider circuit including two first fixed resistors connected serially to each other at a third node;
a first comparator for comparing a voltage potential of the first node with a voltage potential of the third node, and for outputting a digital signal consisting of a high level signal and a low level signal based on a result of the comparison;
a second comparator for comparing a voltage potential of the second node with a fixed voltage potential and for outputting a digital signal consisting of a high level signal and a low level signal based on a result of the comparison;
a digital to analog converter for converting a digital signal including the digital signal output from the first comparator and the digital signal output from the second comparator into an analog signal; and
an object displaceable in the predetermined direction, the object being made of magnetic material, the object including:
a projection that faces the magnetoresistive elements, and
a shaft connected to the projection, the shaft being located away from the pole surface by a distance longer than a distance between the projection and the pole surface of the magnet,
wherein the projection has a width in the predetermined direction that is equal to or smaller than twice an interval between the magnetoresistive elements.

2. The non-contact position sensor according claim 1, further comprising a second voltage divider circuit including two second fixed resistors connected serially to each other at a fourth node, the second voltage divider circuit outputting the fixed potential from the fourth node.

3. The non-contact position sensor according claim 1, wherein the magnetoresistive elements have characteristics identical to each other.

* * * * *